(12) United States Patent
Siers et al.

(10) Patent No.: US 6,269,386 B1
(45) Date of Patent: Jul. 31, 2001

(54) 3X ADDER

(75) Inventors: Scott E. Siers, Elk Grove; Mohammad A. Abdallah, Folsom; Saif M. Alam, Rancho Cordova, all of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/172,933

(22) Filed: Oct. 14, 1998

(51) Int. Cl.[7] .................................................. G06F 7/50
(52) U.S. Cl. ................................................................. 708/710
(58) Field of Search ..................................... 708/710, 711, 708/712, 713

(56) References Cited

U.S. PATENT DOCUMENTS 5,701,504 * 12/1997 Timko ................................... 708/710
5,875,125 * 2/1999 Hwang et al. ....................... 708/710
5,964,827 * 10/1999 Ngo et al. ............................ 708/710

* cited by examiner

Primary Examiner—David H. Malzahn
(74) Attorney, Agent, or Firm—Seth Kalson

(57) ABSTRACT

A 3x adder for adding 2a to a, where a is a binary number, the binary numbers 2a and a partitioned so that $2a=(x^k \ldots x^0)$ and $a=(y^k \ldots y^0)$ where $x^i$ and $y^i$ have the same size for each $i=0, 1, \ldots, k$, where the 3x adder provides the group generate terms for the sums $x^i+y^i$, $i=0, 1, \ldots, k$, according to Boolean expressions, where for any sum $x^i+y^i$ where $x^i$ and $y^i$ each have size $n_i+1$, the number of Boolean variables in the product terms in the Boolean expression for the group generate terms of $x^i+y^i$ do not exceed $j+1$, where $j$ is the largest integer not exceeding $n_i/2$.

14 Claims, 9 Drawing Sheets

& # 3X ADDER

FIELD OF THE INVENTION

The present invention relates to adders, and more particularly to adders for adding a binary number a to 2a.

BACKGROUND

Performing floating point multiplication of binary operands with Booth encoding requires several multiples of the operands. Specifically, for radix-8 Booth encoding with an operand a, the products ±a, ±2a, ±3a, and ±4a are required. All such products except ±3a are easily obtained with simple bit shifts. One way to obtain 3a is to add 2a to a, where 2a is obtained from a by a bit shift. However, the integer sum of 2a with a is required. We shall refer to an adder for providing a signal indicative of 3a for any binary number a as a 3x adder.

A Kogge-Stone adder can be useful for performing integer summation. Like a Carry Look Adder (CLA), the Kogge-Stone adder provides generate and propagate terms. However, to exploit parallelism, various bits of the operands are grouped together and the Kogge-Stone adder operates on these groups in parallel to provide group generate and group propagate terms for these groups. These group generate and group propagate terms are eventually used by the Kogge-Stone adder to provide the carry terms, from which the sum is obtained from these carry terms and the original operands. This is now described in more detail below.

A functional diagram for a Kogge-Stone adder is shown in FIG. 1. The binary numbers a and b are added together to obtain their sum s. We denote the $i^{th}$ component of these binary numbers by $a_i$, $b_i$, and $s_i$, respectively. In FIG. 1, the components of a and b are grouped into n+1 groups, where only the first (group 0), second (group 1), and last (group n) groups are explicitly shown. Not all groups need have the same number of components. For example, in FIG. 1, group 0 has j+1 components, group 1 has k+1 components, and group n has m+1 components.

PG generators 102, 104, 106, and 108 provide group generate and group propagate terms. PG generators 102, 104, and 106 constitutes a first stage (level) and may be operated in parallel, and PG generator 108 constitutes a second stage (level). C generator 116 generates carry-out terms. CSS (Conditional Sum Selector) generators 110, 112, and 114 provide the sum s, and may be operated in parallel. Pipelining may be employed in which the first stage of PG generators operates on new data when the CSS generators are operating on old data.

The lines in FIG. 1 represent data flow lines. Their physical realization may comprise more than one wire for carrying a signal, or signals may be time-multiplexed on a single wire (and ground plane). The designation of data represented by a data flow line is indicated in FIG. 1. For example, PG generator 102 provides the terms $gg_m^n$ and $gp_m^n$ on data flow line 116. These terms represent, respectively, the highest order (m) group generate and group propagate terms for group n. When describing group generate and group propagate terms for an arbitrary group, the superscripts for these terms will not be indicated.

An arbitrary PG generator is shown in FIG. 2. For an arbitrary index i, $gg_i=1$ if a carry-out term is generated when adding the binary number $(x_i\ x_{i-1}\ \ldots\ x_0)$ to the binary number $(y_i\ y_{i-1}\ \ldots\ y_0)$. The group generate term is zero otherwise. The group propagate term is given by $gp_i=1$ if a carry-in term is propagated when adding the binary numbers $(x_i\ x_{i-1}\ \ldots\ x_0)$ and $(y_i\ y_{i-1}\ \ldots\ y_0)$. The group propagate term is zero otherwise.

The group generate and group propagate terms can be written in terms of the generate terms $g_i$ and propagate terms $p_i$ as indicated in FIG. 2, where $p_i=x_i+y_i$ and $g_i \overset{32}{=} x_i y_i$. Although the symbol + has been used before to indicate the ordinary summation symbol in the field of integers, in the previous sentence and elsewhere it is also used to indicate the logical (Boolean) OR in which the operands are now the Boolean elements "1" and "0", and its particular meaning will be clear from context. The product of Boolean variables indicates the logical AND of the Boolean variables. In FIG. 1, the summation symbol $\Sigma$ indicates the logical OR sum. By definition, $gg_0=g_0$.

As shown in FIG. 1, the input data to PG generator 108 are the highest order group generate and group propagate terms from each PG generator in the first stage of the CLA. These quantities are operated on by PG generator 108 to provide new (effective) group generate and group propagate terms $gg^i$ and $gp^i$, $i=0, 1, \ldots, n$. These effective group generate and group propagate terms are interpreted as follows. Let $a^i$ denote group i of the components of a. Similarly for $b^i$. For example, according to the grouping indicated in FIG. 1, $a^0=(a_j\ a_{j-1}\ \ldots\ a_0)$. Then, $gg^i=1$ indicates that a carry-out term is generated when adding the two binary numbers $(a^i\ a^{i-1}\ \ldots\ a^0)$ and $(b^i\ b^{i-1}\ \ldots\ b^0)$, where these two binary numbers are formed from the concatenation of the first i+1 groupings of a and b, respectively. If $gg^i=0$, then no carry-out term is generated. Similarly, $gp^i=1$ indicates that a carry-in term is propagated when adding the two binary numbers $(a^i\ a^{i-1}\ \ldots\ a^0)$ and $(b^i\ b^{i-1}\ \ldots\ b^0)$. If $gp^i=0$, then no carry-in term is propagated.

As shown in FIG. 1, C generator 116 provides carry-out terms $c_{out}^i$ for $i=0, 1, \ldots n$. FIG. 3 also illustrates C generator 116 and provides the Boolean expression for the carry-out terms as a function of the effective group generate and group propagate terms and the carry-in term Cin. A carry-out term $c_{out}^i$ for some i is the carry-out term obtained by adding $(a^i\ a^{i-1}\ \ldots\ a^0)$ and $(b^i\ b^{i-1}\ \ldots\ b^0)$ in which the carry-in term is $c_{in}$. This carry-in term may result from the sum of other bits not shown in FIG. 1. For example, $a_0$ and $b_0$ need not be the least significant bits of the actual binary numbers to be added, in which case there may be other copies of the adder in FIG. 1 to provide other sum bits, or the adder of FIG. 1 may be used more than once in an iterative manner to obtain all sum bits.

As shown in FIG. 1, the carry-out terms from C generator 116 are provided to the CSS generators. For $0 \leq i < n$, the carry-out term $c_{out}^i$ is the carry-in term to the CSS generator corresponding to group i+1. The carry-in term to CSS generator 114 for group 0 is $c_{in}$. As shown in FIG. 1, the carry-out term $c_{out}^0$ is provided to CSS generator 112 corresponding to group 1 and the carry-out term $c_{out}^{n-1}$ is provided to CSS generator 110 corresponding to group n. Note that carry-out term $c_{out}^n$ is available for other adders (not shown), or to indicate overflow, etc.

FIG. 4 illustrates CSS generator 114 and provides the Boolean expression for the $i^{th}$ sum bit, $s_i$. The symbol $\oplus$ denotes exclusive OR. The carry-in term $c_i$ is the carry-in term for bit position i, and its expression in terms of $gg_i$, $gp_i$, and $c_{in}$ (the carry-in term for CSS generator 114) is also given in FIG. 4. Similar expressions are easily generalized for the other CSS generators in the Kogge-Stone adder of FIG. 1. A circuit at the logic gate level for the CSS generator of FIG. 4 is provided in FIG. 5, where MUX 502 switches to line 504 if $c_{in}=0$ and switches to line 506 if $c_{in}=1$.

From the expression for $gg_i$ given in FIG. 2, it is seen that obtaining the highest order group generator term $gg_j$ for a PG generator of size j+1 (i.e., a PG generator corresponding to groupings of a and b with j+1 bits each) requires evaluating the logical OR of j+1 product terms, where the most complicated product term is the logical AND of j+1 terms.

For example, a domino or dynamic logic gate realization for obtaining the group generator term $gg_4$ is shown in FIG. 6. Transistors 602 and 604 are gated by a clock signal CLK, where the domino gate is in its precharge phase when CLK is LOW and is in its evaluation phase when CLK is HIGH. The output node of the domino gate is node 610. Transistors 606 and 608 constitute a static inverter gate. The stack depth of the domino gate in FIG. 6 is defined to be 5. That is, the clocked transistors are not counted. For some implementations, clocked transistor 602 is not needed. In general, a stack depth may be defined as the largest number of nFETs (n-Field Effect Transistors) in series between the output node and ground if no clocked nFET is present, or between the output node and the clocked nFET if a clocked nFET is present. For the general case, a domino gate providing $gg_i$ has a stack depth of j+1.

Because of the body effect of stacking nFETs in series, a logic gate tends to slow down as its stack depth increases. That is, the latency between output and input increases. Because not all paths in a domino gate between the output node and ground have the same number of nFETs, the increase in latency depends upon the particular input values. For example, in FIG. 6 the worst case scenario for increasing the latency is when all generator terms except $g_0$ are 0 (LOW) and all propagate terms are 1 (HIGH). On average, latency will increase with increasing stack depth.

There are, however, no stack depth problems associated with domino gates for obtaining the group propagate terms because a simple NOR domino gate may be used in which the stack depth is only one.

Stack depths for obtaining the group generate terms can be reduced by employing more than one level of logic, but each additional level increases the over-all latency for computing the group generator terms. Thus, for many high-speed circuits the size of a PG generator according to FIG. 2 is limited to a fairly small number (e.g., not much more than four or five). However, decreasing the size of groupings (to decrease the size of PG generators in the first stage of a Kogge-Stone adder) leads to an increase in the number of groups in the first stage, which increases the size of the second stage (i.e., the size of functional unit 108 becomes too large).

It is therefore desirable to provide a 3x adder in which the stack depths associated with obtaining the group generate terms can be reduced.

DETAILED DESCRIPTION OF EMBODIMENTS

Simplified expressions for the group generate terms are provided. These simplified expressions are appropriate if the inputs to the PG generators are related to each other by one bit shift. Consequently, they are appropriate for the first stage of a Kogge-Stone adder when used to provide a signal indicative of 3a, where a is a binary number. However, embodiments need not be limited to a Kogge-Stone implementation.

Figure 7:
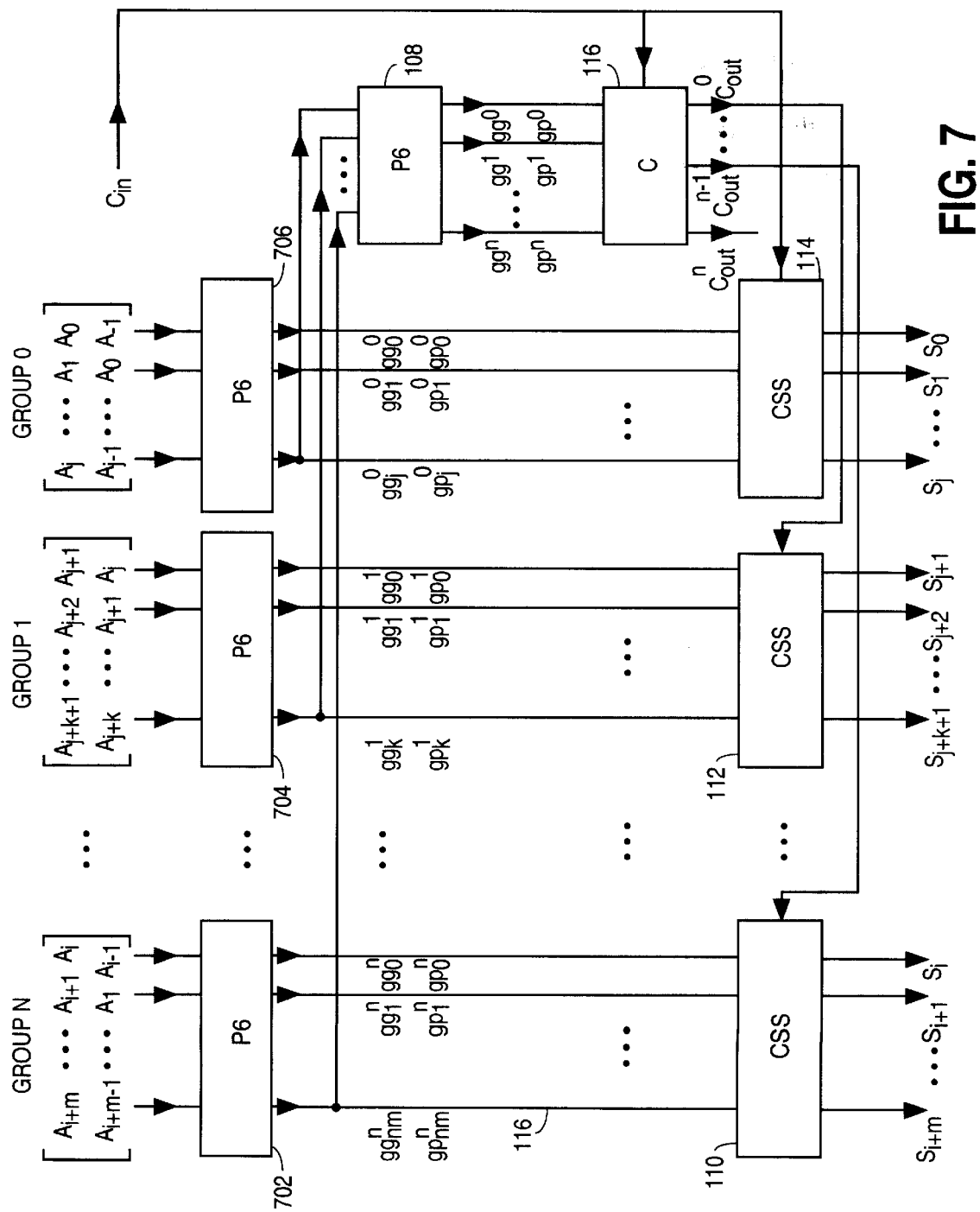
FIG. 7 is a functional diagram of a 3x adder according to an embodiment of the present invention.

FIG. 7 illustrates an embodiment of a 3x adder. If $a_0$ is the first bit of a, then in the particular embodiment of FIG. 7, $a_{-1}$ is set to 0. Also, we assume that $a_{i+m}=0$ so that the most significant bit of a is not lost when applying a bit shift to a. In this way, the sum provided by CSS generators is indeed 3a. However, as will be clear from the detailed description given below, 3x adders utilizing the structure of the embodiment of FIG. 7 can by employed even if $a_{-1} \neq 0$ or $a_{i+m} \neq 0$. For example, not all bits of a need be provided to the first stage of PG generators in FIG. 7 in one clock cycle. In this case, after one iteration of the 3x adder of FIG. 7, s is not necessarily the sum of 3a, and additional copies of adders, or multiple use of the 3x adder of FIG. 7, or a combination thereof, will be needed to provide the final sum.

Figure 1:
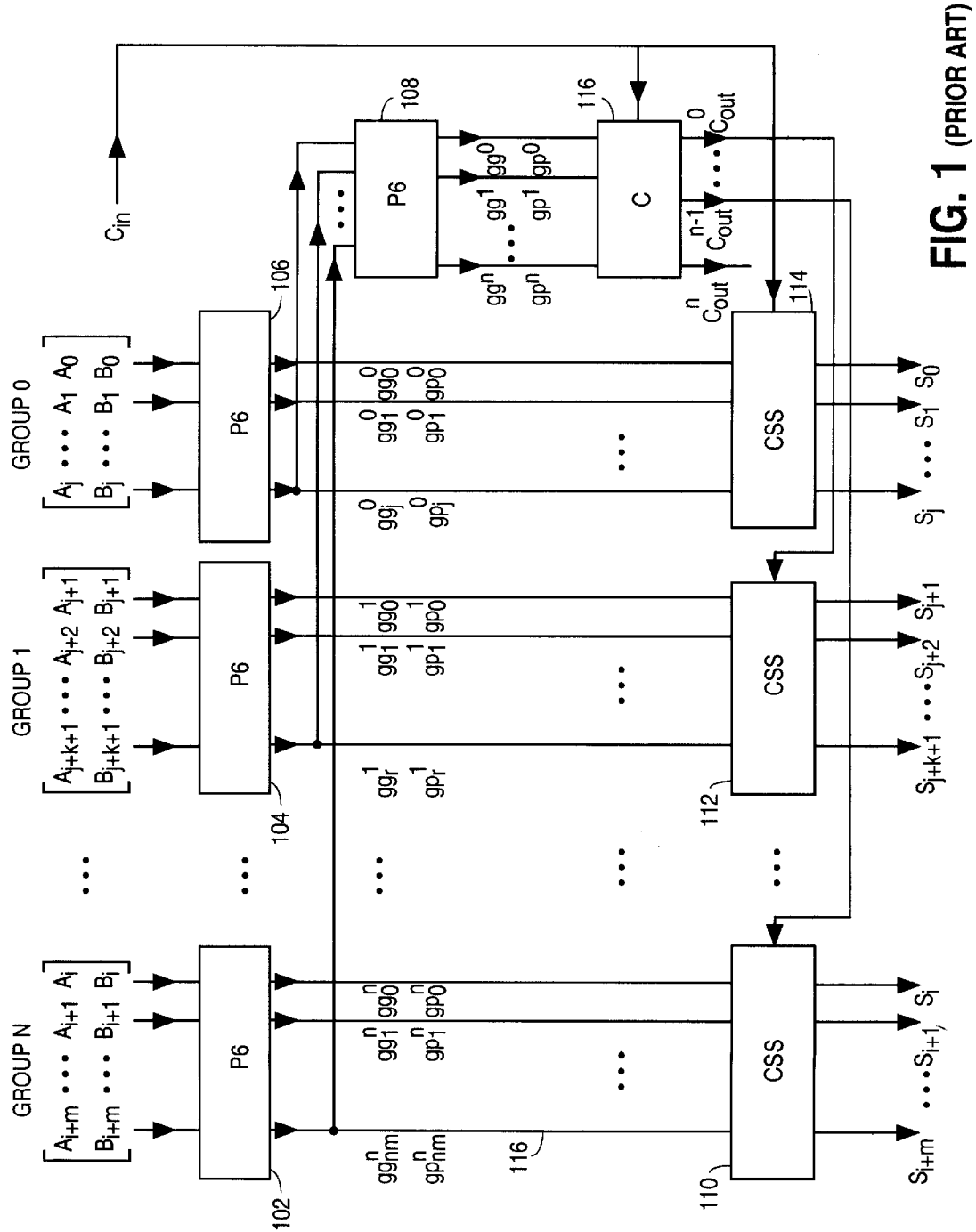
FIG. 1 is a prior art functional diagram of a Kogge-Stone adder.
Figure 2:
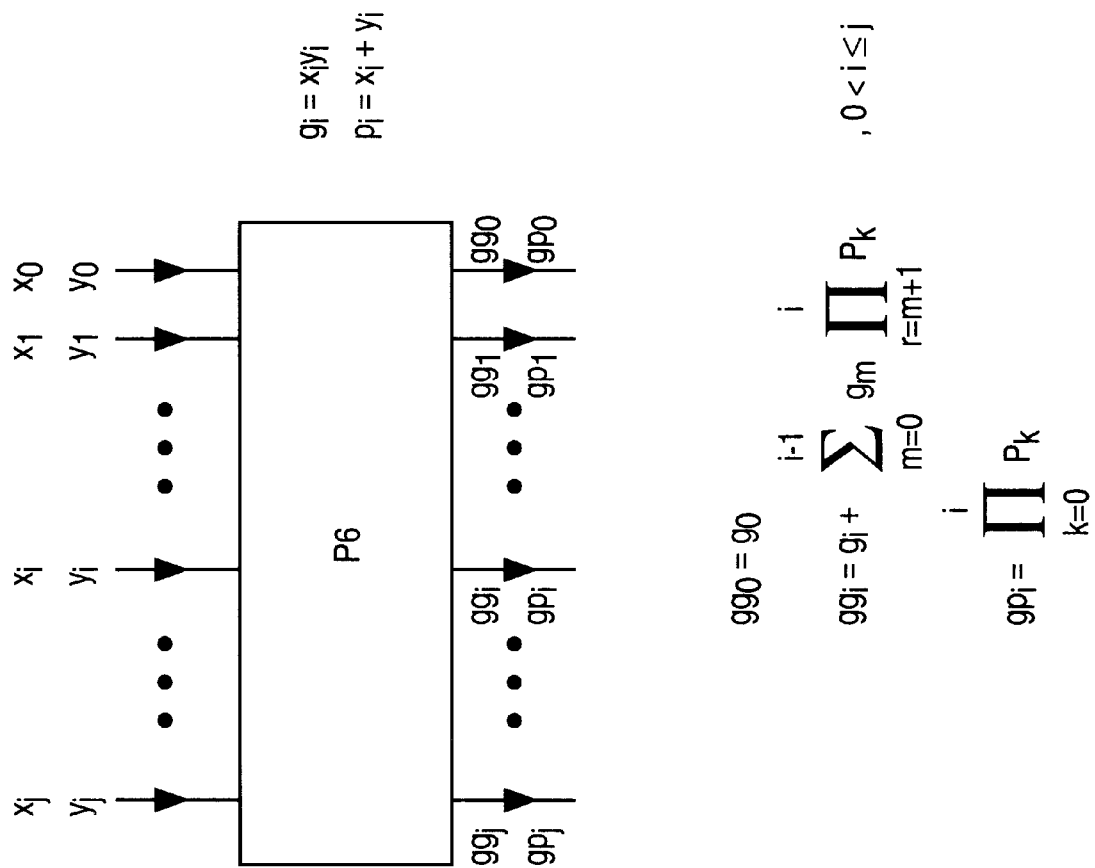
FIG. 2 is a prior art PG generator for group generate terms and group propagate terms.
Figure 3:
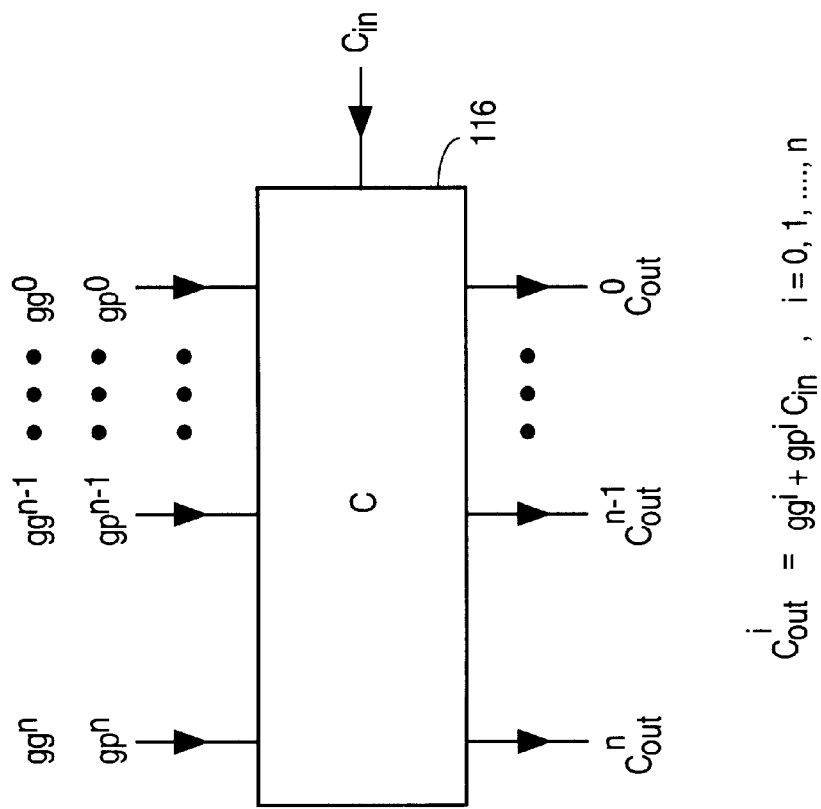
FIG. 3 is a prior art C generator for carry-out terms.
Figure 4:
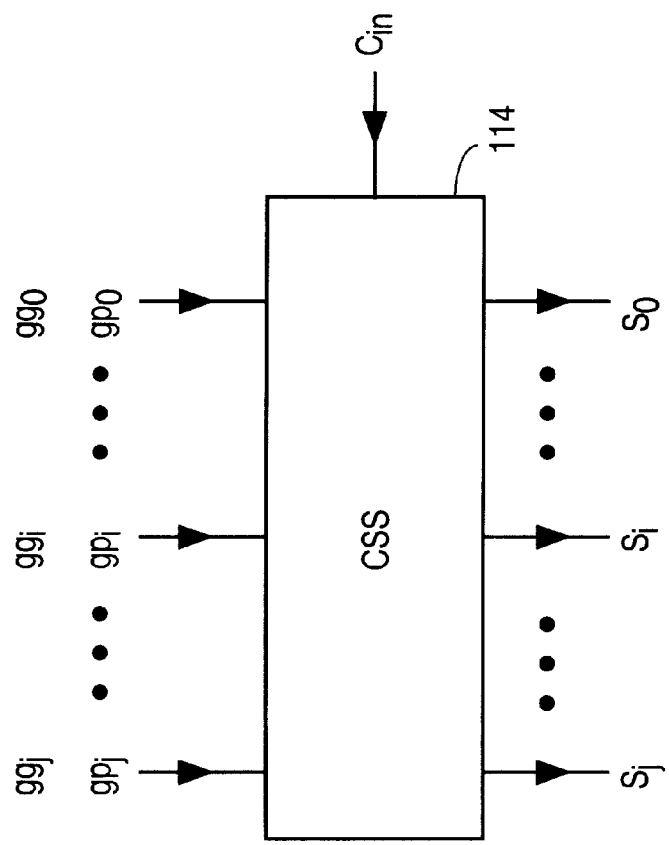
FIG. 4 is a prior art CSS generator for sum bits.
Figure 5:
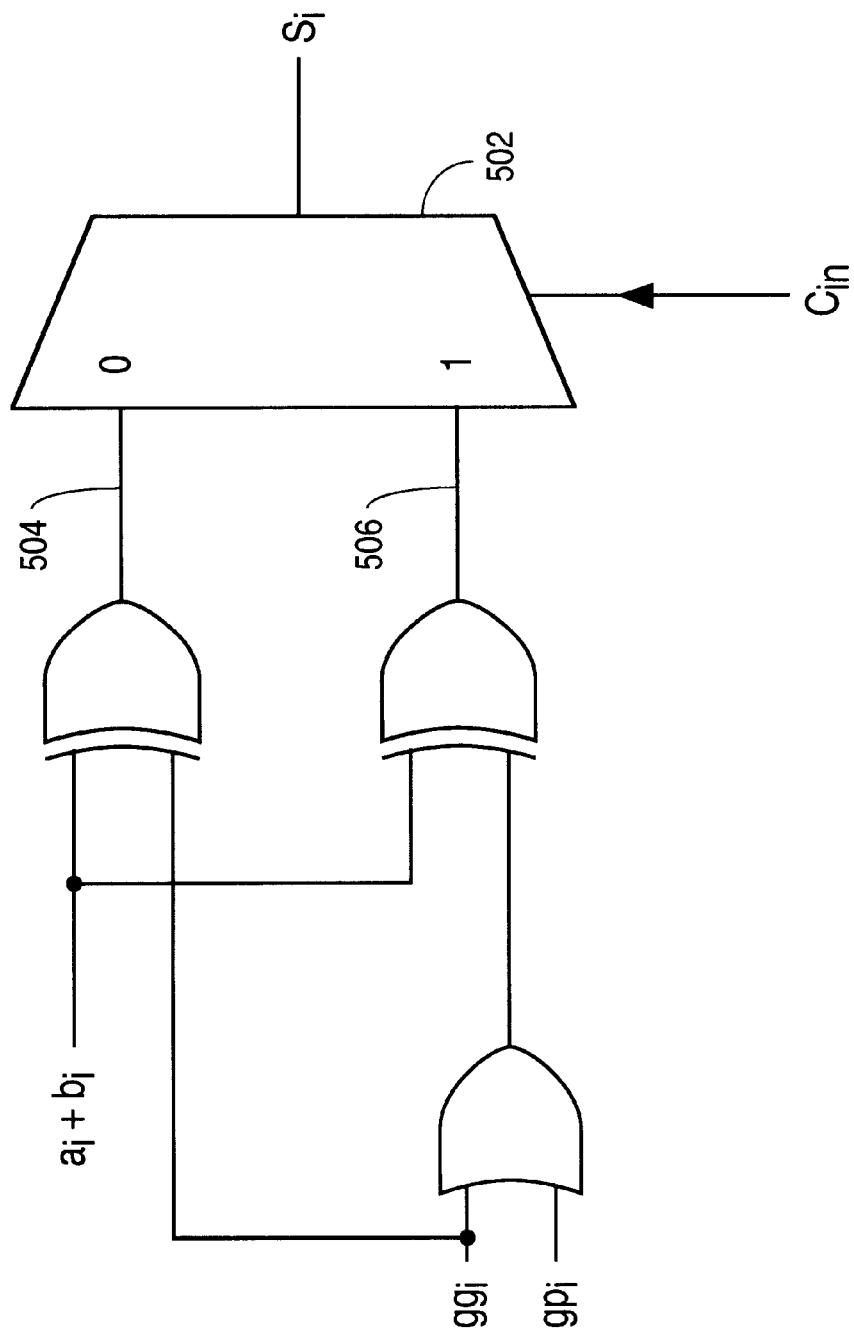
FIG. 5 is a prior art circuit at a logic gate abstraction for the CSS generator of FIG. 4.

The bits of a may be shifted by a shift register, or multiplexers with the proper connection to the inputs of the PG generators in FIG. 7 may provide for the bit shift. Various other techniques may be employed. Functional units shown in FIG. 7 with the same structure as functional units in FIG. 1 are labeled accordingly.

Figure 8:
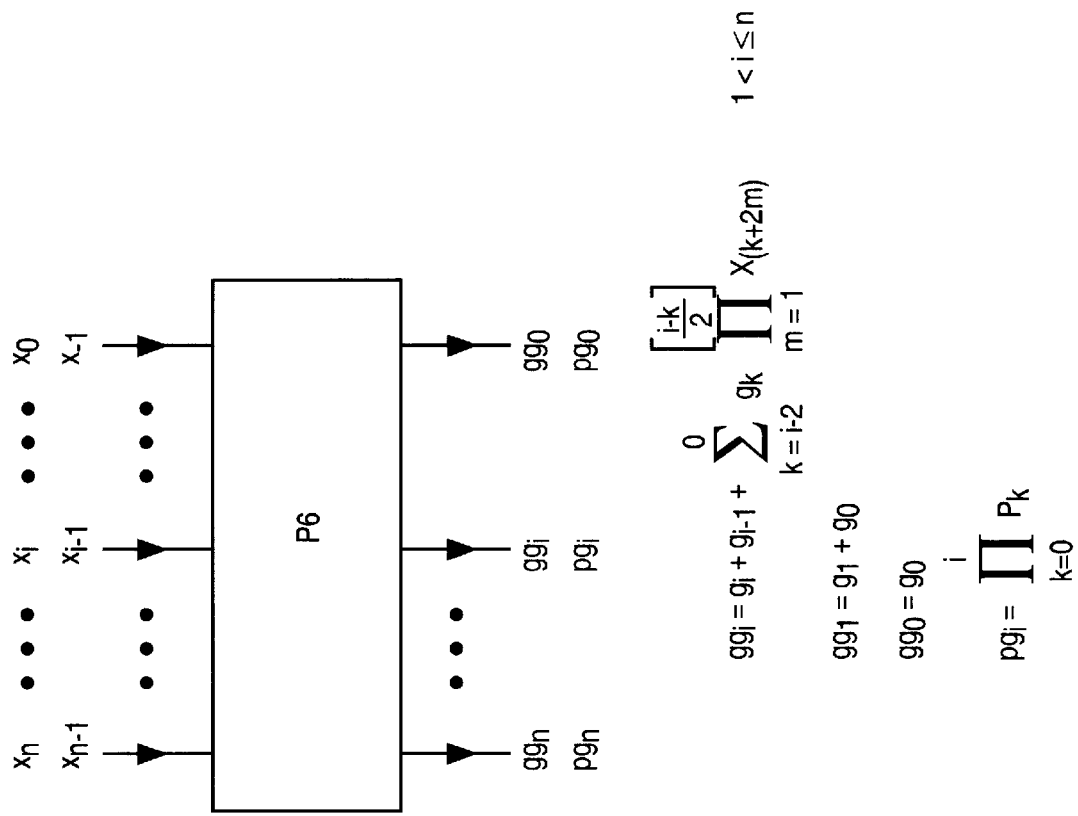
FIG. 8 is a PG generator according to an embodiment of the present invention.

Embodiments of PG generators 702, 704, and 706 provide group generate terms according to the Boolean function given in FIG. 8, where for any x>0, $\lfloor x \rfloor$ denotes the largest integer less than or equal to x. In FIG. 8, $x_{-1}$ and $x_n$ are not necessarily zero because $(x_n \ldots x_{-1})$ may represent any string of n+2 consecutive bits of the binary number a.

The expression for the group generate terms given in FIG. 8 can be verified by applying Boolean identities as follows. The group generate term $gg_1$ is given as $$gg_1 = g_1 + p_1 g_0$$
$$= x_1 x_0 + (x_1 + x_0)(x_0 x_{-1})$$
$$= x_1 x_0 + x_1 x_0 x_{-1} + x_0 x_{-1}$$
$$= x_1 x_0 + x_0 x_{-1}$$
$$= g_1 + g_0,$$

where use was made of the identities $x_0 x_0 x_{-1} = x_0 x_{-1}$ and $$x_1 x_0 x_{-1} + x_0 x_{-1} = (x_1 + 1) x_0 x_{-1} = x_0 x_{-1}.$$

Similarly, $$gg_2 = g_2 + p_2 gg_1$$
$$= x_2 x_1 + (x_2 + x_1)(x_1 x_0 + x_0 x_{01})$$
$$= x_2 x_1 + x_2 x_1 x_0 + x_2 x_0 x_{-1} + x_1 x_0 + x_1 x_0 x_{-1}$$
$$= x_2 x_1 + x_2 x_0 x_{-1} + x_1 x_0$$

-continued $$= g_2 + g_1 + x_2 g_0.$$

Continuing in this way, the expression for the group generate terms in FIG. 8 can be verified.

For a PG generator of size n+1, the largest product term in the expression for the highest order group generate term $gg_n$ as given in FIG. 8 requires the logical AND of $\lfloor n/2 \rfloor + 1$ terms. This is an improvement over the PG generator of FIG. 1. Therefore, the group size of the first stage PG generators in FIG. 7 can be greater than the group size of FIG. 1, and still have a smaller latency. A larger group size for the first stage results in fewer entries to second stage PG generator 108 in FIG. 7, thereby resulting in a reduction in latency for the second stage PG generator when compared to that of FIG. 1.

Alternatively, the group size of the first stage may be increased to where there may be a small increase in latency in the first stage when compared to the adder of FIG. 1, but in which the latency reduction in the second stage still provides an overall improvement in speed. Clearly, depending upon the group size of the first stage of PG generators, various tradeoffs are possible in designing the 3x adder of FIG. 7.

Table 1 provides results of a circuit simulation for the adder of FIGS. 1 and 7 for 68 bit addition. For Table 1, the adder of FIG. 7 has 6-bit groupings for the first stage of PG generators, except for an 8 bit grouping of the most significant bits of a. The adder of FIG. 1 has 8-bit groupings for the first stage of PG generators. For these grouping values, the 3x adder of FIG. 7 has less latency for both stages of PG generators than the adder of FIG. 1, with an overall gain of approximately 11.8%.

TABLE 1

|  | Fig. 1<br>68-Bit Adder<br>(6-bit groupings)<br>(pico-seconds) | Fig. 7<br>3x Adder<br>(8-bit groupings)<br>(pico-seconds) | Gain % |
|---|---|---|---|
| 1st Stage | 366 | 313 | 4.7 |
| 2nd Stage | 399 | 276 | 11.0 |
| Conditional Sum | 352 | 396 | −3.9 |
| Total | 1117 | 985 | 11.8 |

Figure 6:
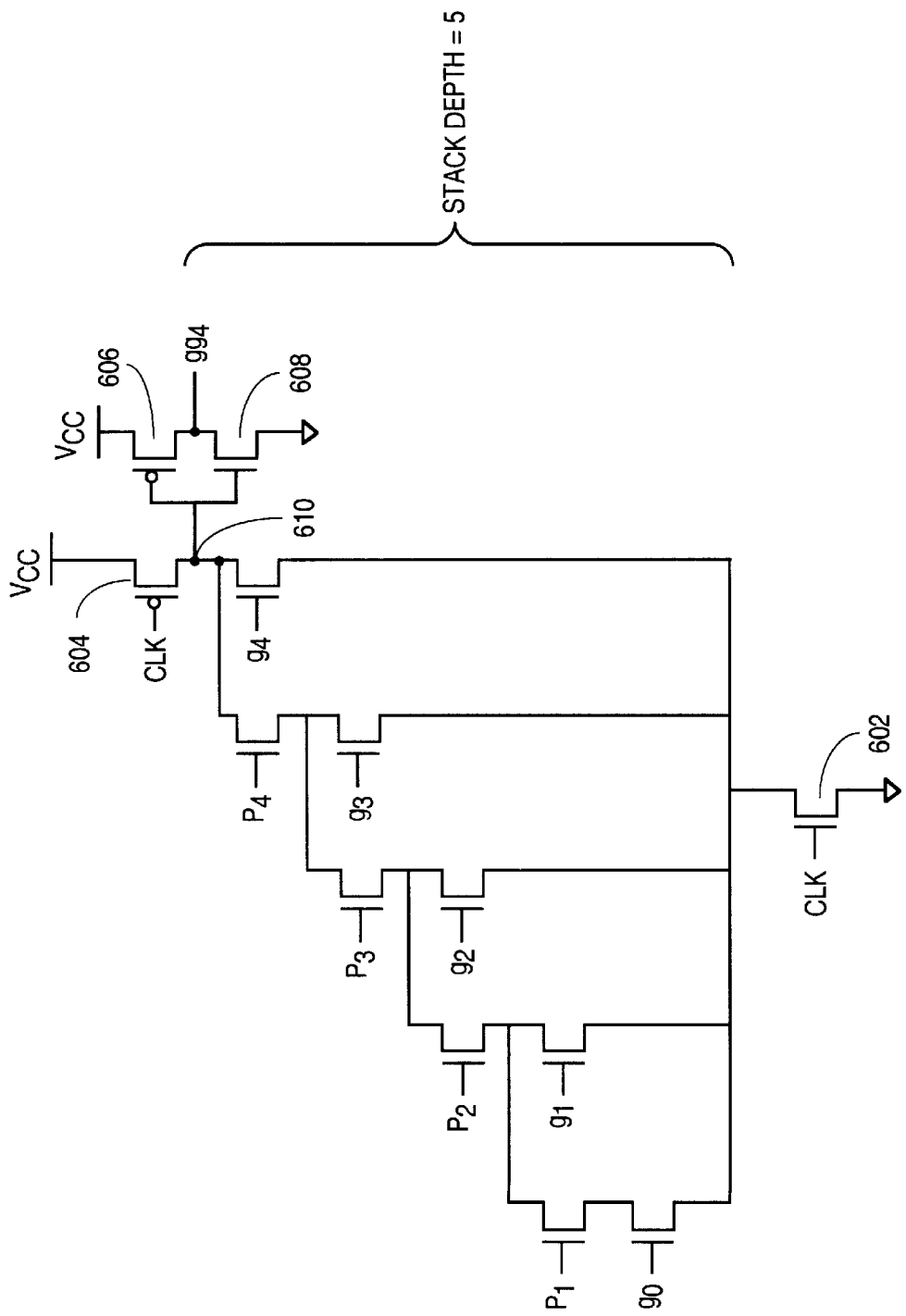
FIG. 6 is a prior art domino logic circuit for a generator term.
Figure 9:
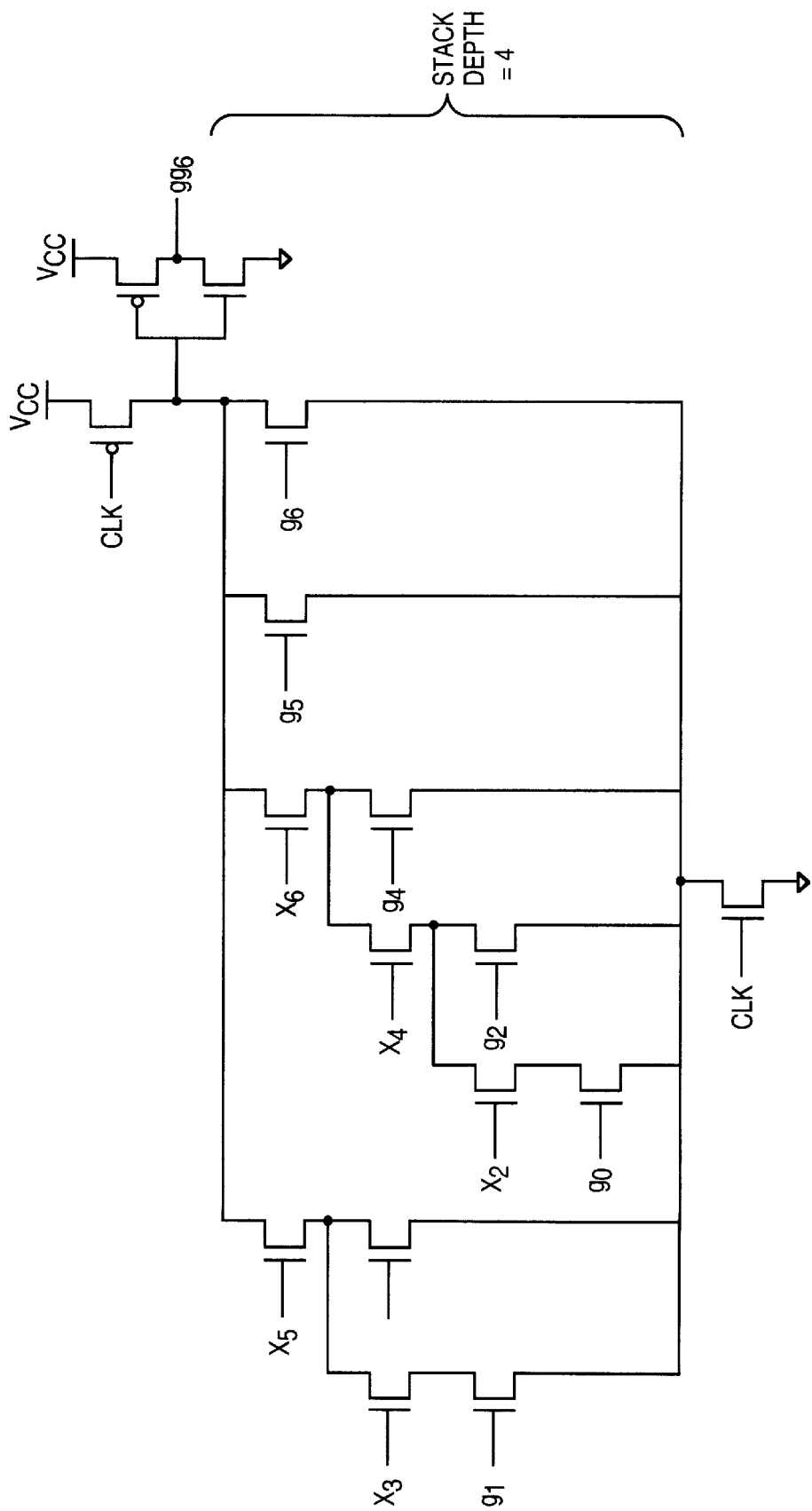
FIG. 9 is a domino logic circuit for a group generate term according to an embodiment of the present invention.

An embodiment for a domino gate implementing the group generate term $gg_6$ for the adder of FIG. 7 is shown in FIG. 9. The stack depth is only 4. This should be contrasted with FIG. 6, which required a stack depth of 5 for a smaller group size of only 4. In general, providing the group generate term $gg_n$ with a domino gate according to the embodiment of FIG. 8 requires a stack depth of $\lfloor n/2 \rfloor + 1$.

If in FIG. 7 the carry-out term is such that if $c_{out}^n = 1$, then an overflow is indicated. As discussed earlier, the structure of the embodiment of FIG. 7 may be used for cases in which $a_{-1} \neq 0$ or $a_{i+m} \neq 0$. For example, if $a_{i+m} \neq 0$, then additional hardware may be employed to provide the most significant bit of the sum given by $a_{i+m} \oplus c_{out}^n$. Clearly, various modifications can be made to the embodiments described above without departing from the scope of the invention as claimed below.

What is claimed is:

1. A circuit to provide an output signal indicative of the group generate term $gg_n$ for binary tuples $(x_n\ x_{n-1}\ \ldots\ x_0)$ and $(x_{n-1}\ x_{n-2}\ \ldots\ x_{-1})$ where n is an integer greater than 1 according to the Boolean expression $$gg_n = g_n + g_{n-1} + \sum_{k=n-2}^{0} g_k \prod_{m=1}^{\lfloor (n-k)/2 \rfloor} x_{k+2m},$$

where $g_i$ is defined by the Boolean expression $g_i = x_i x_{i-1}$ for i=0, 1, . . . n, the circuit comprising a logic gate having a stack depth of $\lfloor n/2 \rfloor + 1$.

2. The circuit as set forth in claim 1, wherein the logic gate is a domino logic gate.

3. An adder to add 2a to a where a is a binary m-tuple, the adder comprising:

a logic gate to provide an output signal indicative of the group generate term $gg_n$ for binary tuples $(x_n\ x_{n-1}\ \ldots\ x_0)$ and $(x_{n-1}\ x_{n-2}\ \ldots\ x_{-1})$ where n is an integer greater than 1 and less than m according to the Boolean expression $$gg_n = g_n + g_{n-1} + \sum_{k=n-2}^{0} g_k \prod_{m=1}^{\lfloor (n-k)/2 \rfloor} x_{k+2m},$$

where $g_i$ is defined by the Boolean expression $g_i = x_i x_{i-1}$ for i=0, 1, . . . n, where $x_n, x_{n-1}, \ldots x_{-1}$ are consecutive components of a, wherein the logic gate has a stack depth of $\lfloor n/2 \rfloor + 1$.

4. The adder as set forth in claim 3, wherein the logic gate is a domino logic gate.

5. A circuit to provide output signals indicative of group generate terms $gg_i$, i=0, 1, . . . n, for binary tuples $(x_n\ x_{n-1}\ \ldots\ x_0)$ and $(x_{n-1}\ x_{n-2}\ \ldots\ x_{-1})$ according to the Boolean expressions $$gg_i = g_i + g_{i-1} + \sum_{k=i-2}^{0} g_k \prod_{m=1}^{\lfloor (i-k)/2 \rfloor} x_{k+2m},\ \text{for}\ 1 < i \leq n,$$

$$gg_1 = g_1 + g_0,$$

$$gg_0 = g_0,$$

where $g_i$ is defined by the Boolean expression $g_i = x_i x_{i-1}$ for i=0, 1, . . . n, the circuit comprising n+1 subcircuits, each $i^{th}$ subcircuit for i=0, 1 . . . n, to provide a signal indicative of the group generate term $gg_i$, i=0, 1, . . . n, wherein each $i^{th}$ subcircuit for i=0, 1 . . . n, has a stack depth of $\lfloor i/2 \rfloor + 1$.

6. The circuit as set forth in claim 5, wherein each subcircuit is a domino logic subcircuit.

7. An adder to add 2a to a where a is a binary m-tuple, the adder comprising:

n+1 subcircuits to provide output signals indicative of group generate terms $gg_i$, i=0, 1, . . . n, for binary tuples $(x_n\ x_{n-1}\ \ldots\ x_0)$ and $(x_{n-1}\ x_{n-2}\ \ldots\ x_{-1})$ where n is an integer greater than 1 and less than m according to the Boolean expressions $$gg_i = g_i + g_{i-1} + \sum_{k=i-2}^{0} g_k \prod_{m=1}^{\lfloor (i-k)/2 \rfloor} x_{k+2m},\ \text{for}\ 1 < i \leq n,$$

$$gg_1 = g_1 + g_0,$$

$$gg_0 = g_0,$$

where $g_i$ is defined by the Boolean expression $g_i = x_i x_{i-1}$ for i=0, 1, . . . n, where $x_n, x_{n-1}, \ldots, x_{-1}$ are consecutive components of a, each $i^{th}$ subcircuit for i=0, 1 ... n, to provide a signal indicative of the group generate term $gg_i$ for i=0, 1 ... n, wherein each $i^{th}$ subcircuit for i=0, 1, ... n has a stack depth of $\lfloor i/2 \rfloor+1$.

8. The adder as set forth in claim 7, wherein each subcircuit is a domino logic subcircuit.

9. A 3x adder for adding 2a to a, where a is a binary number, the 3x adder comprising:

a plurality of k+1 circuits, wherein for each i=0, 1, ..., k, each $i^{th}$ circuit to be responsive to signals indicative of binary tuples $x^i$ and $y^i$ where the binary tuples $x^i$ and $y^i$ partition 2a and a such that 2a =$(x^k ... x^0)$ and a=$(y^k ... y^0)$ with $x^i$ and $y^i$ having the same size, each $i^{th}$ circuit to provide the group generate terms for the sums $x^i+y^i$, i=0, 1, ..., k, according to Boolean expressions, wherein for any sum $x^i+y^i$ where $x^i$ and $y^i$ each have size $n_i+1$, the number of Boolean variables in the product terms in the Boolean expression for the group generate terms of $x^i+y^i$ does not exceed $\lfloor n_i/2 \rfloor+1$.

10. The 3x adder as set forth in claim 9, wherein for an $x^i$ and $y^i$ expressed as binary tuples $(x_n\ x_{n-1} ... x_0)$ and $(x_{n-1}\ x_{n-2} ... x_{-1})$, respectively, where n is an integer greater than 1 and less than m, the Boolean expression for obtaining the group generate term $gg_n$ for $x^i$ and $y^i$ is $$gg_n = g_n + g_{n-1} + \sum_{k=n-2}^{0} g_k \prod_{m=1}^{\lfloor (n-k)/2 \rfloor} x_{k+2m},$$

where $g_i$ is defined by the Boolean expression $g_i=x_i x_{i-1}$ for i=0, 1, ... n.

11. A circuit to provide, in response to input signals indicative of Boolean variables $x_i$, i=−1, 0, 1, 2, ... n, where n is an integer greater than 1, an output signal indicative of the group generate term $gg_n$ for binary tuples $(x_n\ x_{n-1} ... x_0)$ and $(x_{n-1}\ x_{n-2} ... x_{-1})$, the circuit comprising:

$\lfloor n/2 \rfloor+1$ transistors coupled in series and having gate voltages indicative of a set of $\lfloor n/2 \rfloor+1$ Boolean variables $\{g_0, x_{2m}, m=1, 2, ..., \lfloor n/2 \rfloor\}$, where $g_0=x_0 x_{-1}$.

12. The circuit as set forth in claim 11, further comprising a node, wherein each transistor is an nMOS transistor coupled to the node to bring the node LOW if each Boolean variable in the set $\{g_0, x_{2m}, m=1, 2, ..., \lfloor n/2 \rfloor\}$ is a Boolean 1.

13. The circuit as set forth in claim 18, further comprising:

for k=1, ..., n−2, $\lfloor (n-k)/2 \rfloor+1$ transistors coupled in series and having gate voltages indicative of a set of $\lfloor (n-k)/2 \rfloor+1$ Boolean variables $\{g_k, x_{k+2m}, m=1, 2, ... \lfloor (n-k)/2 \rfloor\}$, where $g_k=x_k x_{k-1}$;

a transistor having a gate voltage indicative of $g_{n-1}$; and a transistor having a gate voltage indicative of $g_n$.

14. The circuit as set forth in claim 13, further comprising a node, wherein all said transistors are nMOS transistors coupled to the node to bring the node to a voltage indicative of the group generate term $gg_n$.

* * * * *

UNITED STATES PATENT AND TRADEMARK OFFICE
CERTIFICATE OF CORRECTION

PATENT NO. : 6,269,386 B1  Page 1 of 1
DATED : July 31, 2001
INVENTOR(S) : Hu et al.

It is certified that error appears in the above-identified patent and that said Letters Patent is hereby corrected as shown below:

Title page,
Item [57], ABSTRACT,
Delete "$n_1+1$" after "cash have size", insert -- $n_i+1$ --.

Signed and Sealed this

Third Day of September, 2002

*Attest:*

*Attesting Officer*

JAMES E. ROGAN
*Director of the United States Patent and Trademark Office*